(12) United States Patent
Xu et al.

(10) Patent No.: US 11,305,765 B2
(45) Date of Patent: Apr. 19, 2022

(54) METHOD FOR PREDICTING MOVEMENT OF MOVING OBJECTS RELATIVE TO AN AUTONOMOUS DRIVING VEHICLE

(71) Applicant: Baidu USA LLC, Sunnyvale, CA (US)

(72) Inventors: Kecheng Xu, Sunnyvale, CA (US);
Yajia Zhang, Sunnyvale, CA (US);
Hongyi Sun, Sunnyvale, CA (US);
Jiacheng Pan, Sunnyvale, CA (US);
Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 402 days.

(21) Appl. No.: 16/392,354

(22) Filed: Apr. 23, 2019

(65) Prior Publication Data

US 2020/0339116 A1    Oct. 29, 2020

(51) Int. Cl.
*B60W 30/095* (2012.01)
*G06N 20/00* (2019.01)
*B60W 30/09* (2012.01)

(52) U.S. Cl.
CPC ........ *B60W 30/0956* (2013.01); *B60W 30/09* (2013.01); *G06N 20/00* (2019.01)

(58) Field of Classification Search
CPC ................. B60W 30/09–095; G06N 20/00
See application file for complete search history.

(56) References Cited

U.S. PATENT DOCUMENTS

| | | | | |
|---|---|---|---|---|
| 9,645,577 B1 * | 5/2017 | Frazzoli | ............. | B60W 30/0956 |
| 10,259,458 B2 * | 4/2019 | Yoo | .................. | B60W 30/0956 |
| 2009/0093960 A1 * | 4/2009 | Puhalla | ............... | B60W 40/076 701/301 |
| 2016/0129907 A1 * | 5/2016 | Kim | ...................... | B60W 30/09 701/26 |
| 2017/0057498 A1 * | 3/2017 | Katoh | ................. | B60W 10/184 |
| 2018/0345963 A1 * | 12/2018 | Maura | .................. | G05D 1/0223 |
| 2019/0250617 A1 * | 8/2019 | Ford | ................. | B60W 50/0097 |
| 2019/0377351 A1 * | 12/2019 | Phillips | ................ | G05D 1/0214 |
| 2020/0156631 A1 * | 5/2020 | Lin | ........................ | G08G 1/165 |

FOREIGN PATENT DOCUMENTS

TW          107140629       * 11/2018   .......... B60W 30/095

* cited by examiner

*Primary Examiner* — Calvin Cheung

(74) *Attorney, Agent, or Firm* — Womble Bond Dickinson (US) LLP

(57) ABSTRACT

In response to perceiving a moving object, one or more possible object paths of the moving object are determined based on the prior movement predictions of the moving object, for example, using a machine-learning model, which may be created based on a large amount of driving statistics of different vehicles. For each of the possible object paths, a set of trajectory candidates is generated based on a set of predetermined accelerations. Each of the trajectory candidates corresponds to one of the predetermined accelerations. A trajectory cost is calculated for each of the trajectory candidates using a predetermined cost function. One of the trajectory candidates having the lowest trajectory cost amongst the trajectory candidates is selected. An ADV path is planned to navigate the ADV to avoid collision with the moving object based on the lowest costs of the possible object paths of the moving object.

20 Claims, 14 Drawing Sheets

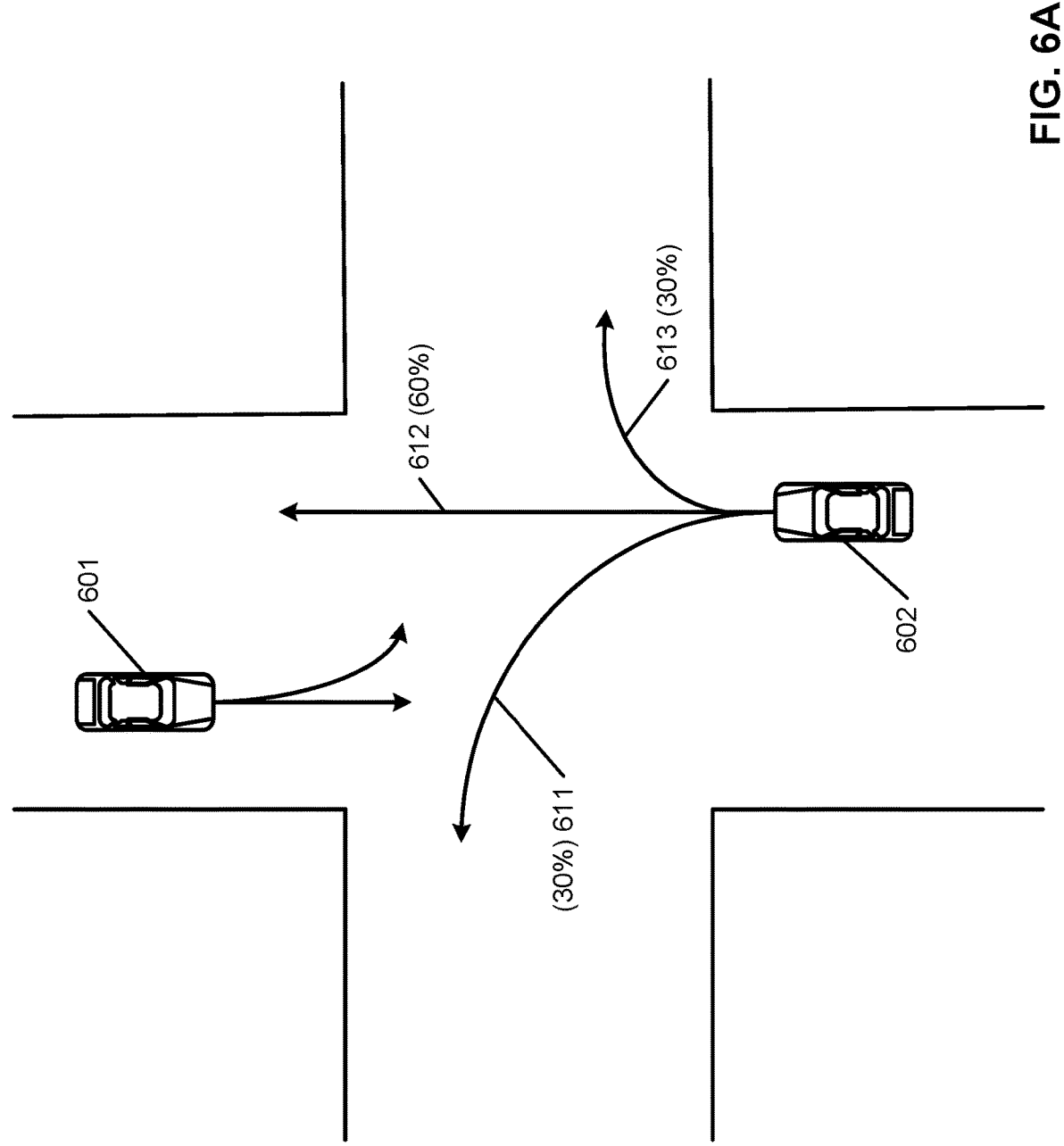

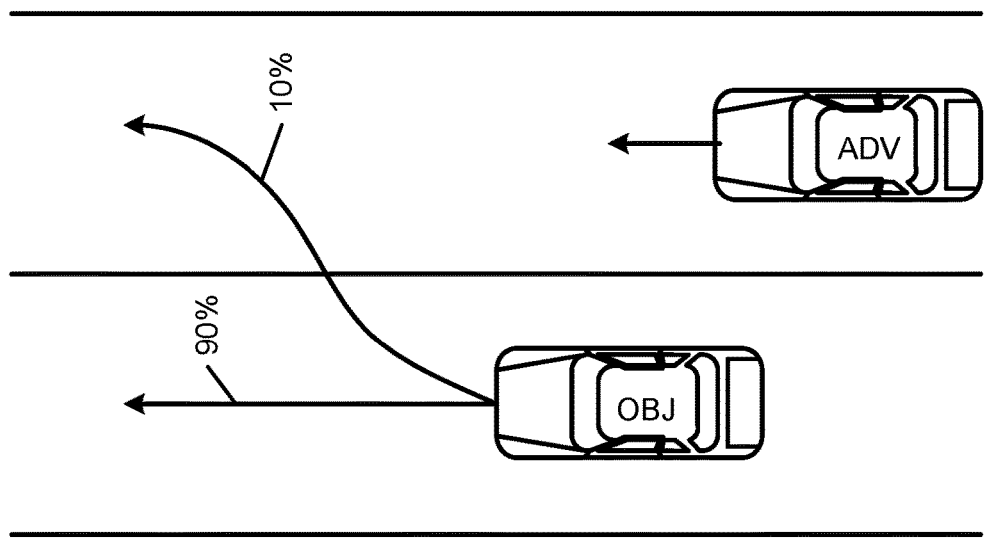
FIG. 7B
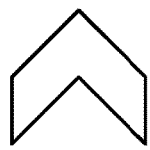
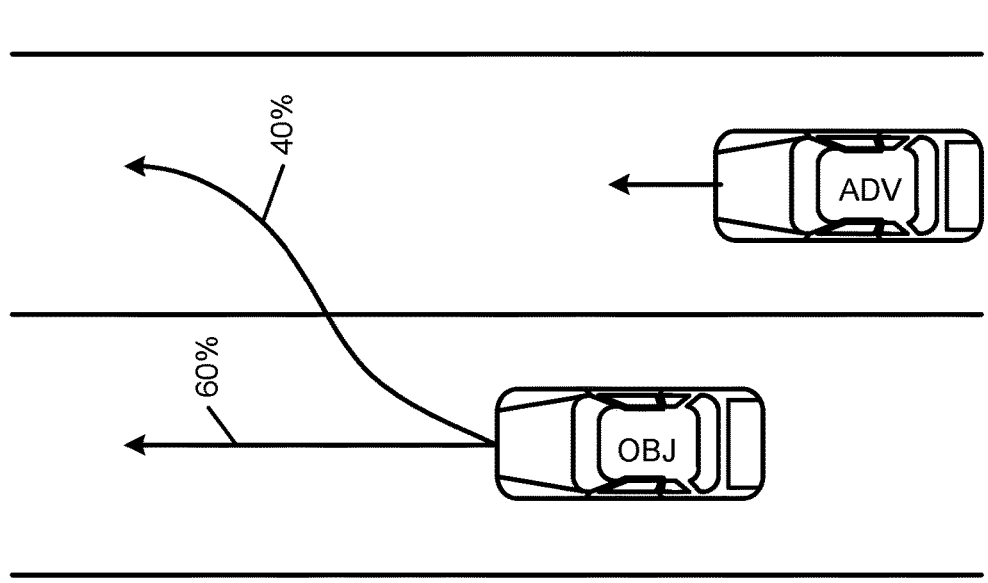
FIG. 7A

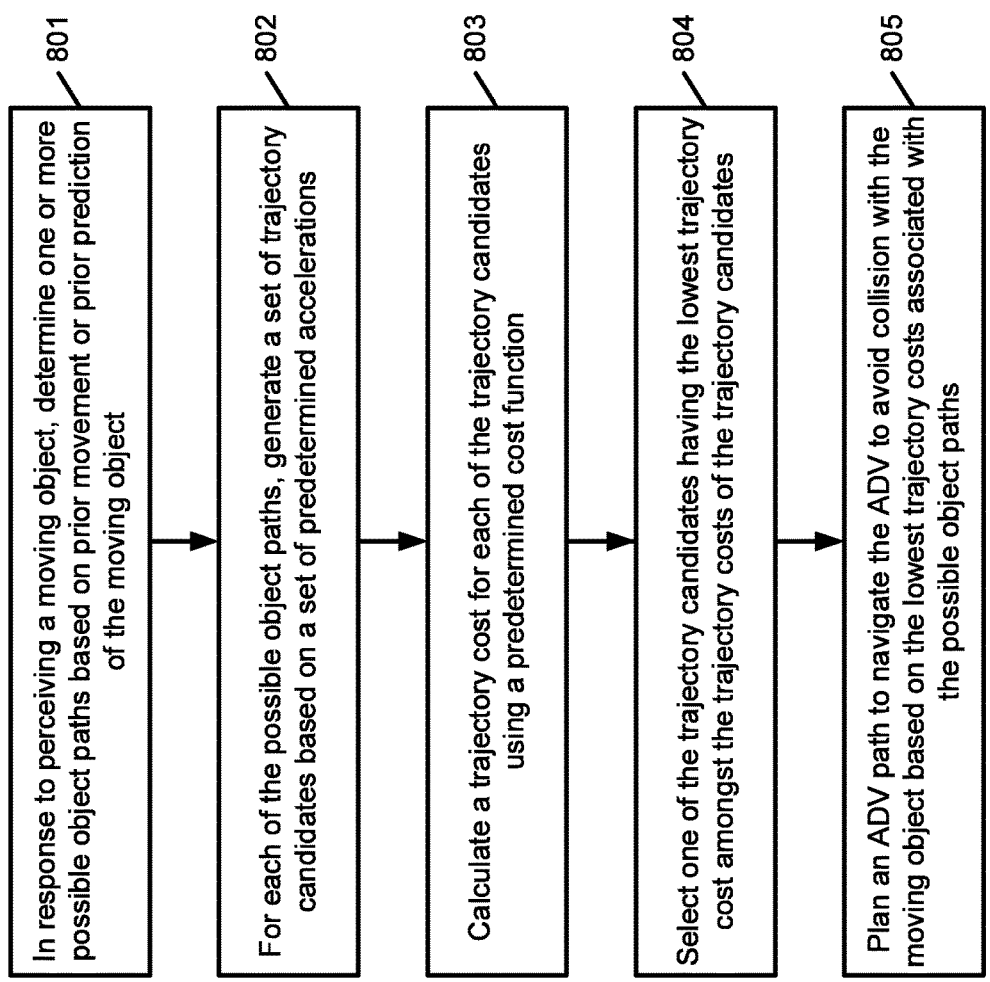

METHOD FOR PREDICTING MOVEMENT OF MOVING OBJECTS RELATIVE TO AN AUTONOMOUS DRIVING VEHICLE

TECHNICAL FIELD

Embodiments of the present disclosure relate generally to operating autonomous vehicles. More particularly, embodiments of the disclosure relate to predicting movement of moving objects based on interaction with an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In autonomous driving, in response to a moving object such as a vehicle, a prediction of the moving object is performed based on the driving environment surrounding the autonomous driving vehicle. The motion planning can then be performed based on the movement predictions of the moving object. However, such a prediction is not sufficient enough to accurately predict the future movement of the moving object.

BRIEF DESCRIPTION OF THE DRAWINGS

Embodiments of the disclosure are illustrated by way of example and not limitation in the figures of the accompanying drawings in which like references indicate similar elements.

FIGS. 6A-6D are diagrams illustrating a prediction process according to one embodiment.

FIGS. 7A and 7B are diagrams illustrating a prediction process according to another embodiment FIG. 8 is a flow diagram illustrating a prediction process according to one embodiment.

DETAILED DESCRIPTION

Figure 1:
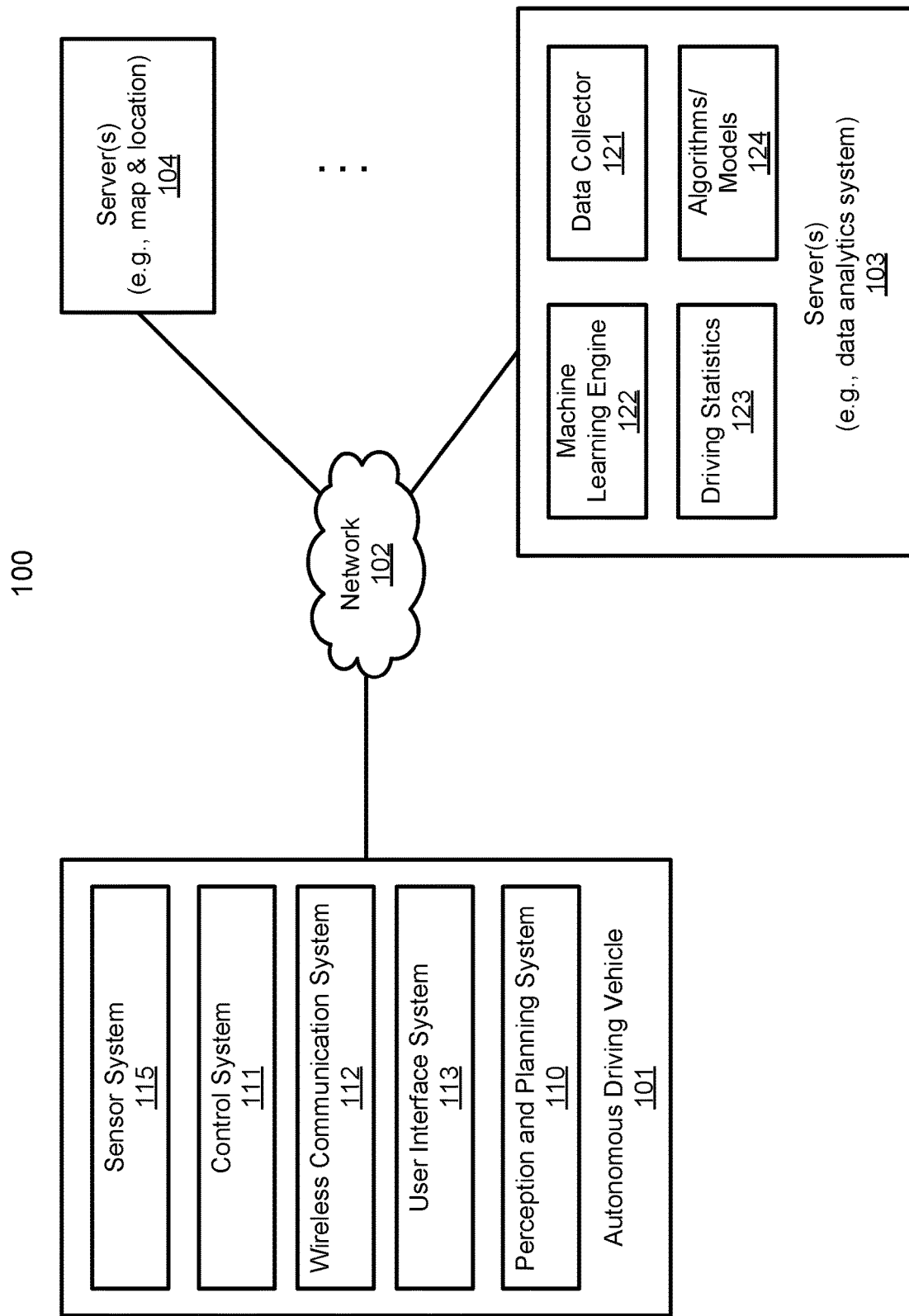
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, after the normal prediction of a moving object, a posterior analysis is performed in view of the current state of an autonomous driving vehicle (ADV), such as, for example, the relative location, speed, and heading direction of the ADV. The analysis is utilized to adjust or improve the prediction of the moving object. As a result, interaction between the moving object and the ADV is taken into consideration to further improve the movement prediction of the moving object, because how the ADV moves may affect the movement of the moving object, or vice versa.

According to one embodiment, in response to perceiving a moving object (e.g., a vehicle), one or more possible object paths of the moving object are predicted or determined based on the prior movement predictions of the moving object, for example, using a machine-learning model, which may be created based on a large amount of driving statistics of different vehicles. For each of the possible object paths, a set of trajectory candidates is generated based on a set of predetermined accelerations. Each of the trajectory candidates corresponds to one of the predetermined accelerations. A trajectory cost is calculated for each of the trajectory candidates using a predetermined cost function. One of the trajectory candidates having the lowest trajectory cost amongst the trajectory candidates is selected to represent the corresponding possible object path. An ADV path is planned to navigate the ADV to avoid collision with the moving object based on the lowest costs of the possible object paths of the moving object.

In one embodiment, in calculating the cost for each of the trajectory candidates, a centripetal acceleration cost and a collision cost are calculated for the trajectory candidate. The trajectory cost of the trajectory candidates is then determined based on the centripetal acceleration cost and the collision cost. When calculating the centripetal acceleration cost of a trajectory candidate, a set of trajectory points along the trajectory candidate is determined and selected. The trajectory points may be evenly distributed in time along the trajectory candidate. For each of the trajectory points, a centripetal acceleration is calculated for the trajectory point. A centripetal acceleration may be determined based on the speed of the moving object and the curvature at the point in time associated with the trajectory point. The centripetal acceleration cost is then determined based on the centripetal accelerations of all the trajectory points using a first cost function. In one embodiment, when calculating a collision cost for a trajectory candidate, a relative distance between an ADV and each of the trajectory points is determined. The collision cost of the trajectory candidate is determined based on the relative distances between the trajectory points and the ADV using a second cost function.

According to a further embodiment, for each of the possible object paths, a likelihood value or probability is determined based on the lowest trajectory cost. The likelihood value represent the likelihood that the moving object will move according to the selected trajectory candidate. A moving probability of the moving object for the possible object path is calculated based on the likelihood value and a prior probability of the selected trajectory candidate (e.g., probability calculated during a prior driving or planning cycle). Note that the above operations may be iteratively performed for each of the moving objects perceived within a predetermined proximity of the ADV. The ADV path is planned based on the moving probabilities of all the moving objects perceived.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
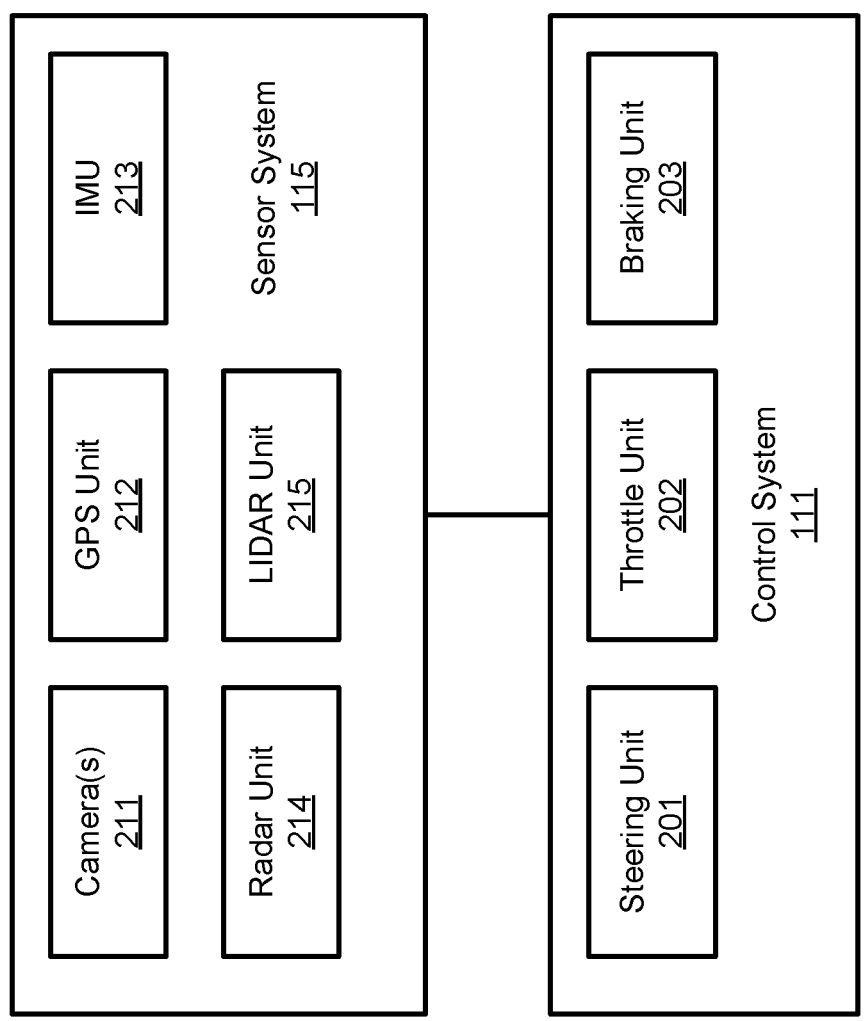
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to perceive a moving object based on sensor data obtained from various sensors mounted on an ADV and to predict a movement or tendency of movement of the moving object in view of the current state of the ADV (e.g., speed, relative location). Specifically, algorithms 124 may include an algorithm or cost function to calculate a centripetal acceleration cost, and a collision cost of trajectory candidates in order to calculate a cost of a possible path that the moving object may move. Algorithms 124 can then be uploaded on ADVs to be utilized during autonomous driving in real-time.

Figure 3A:
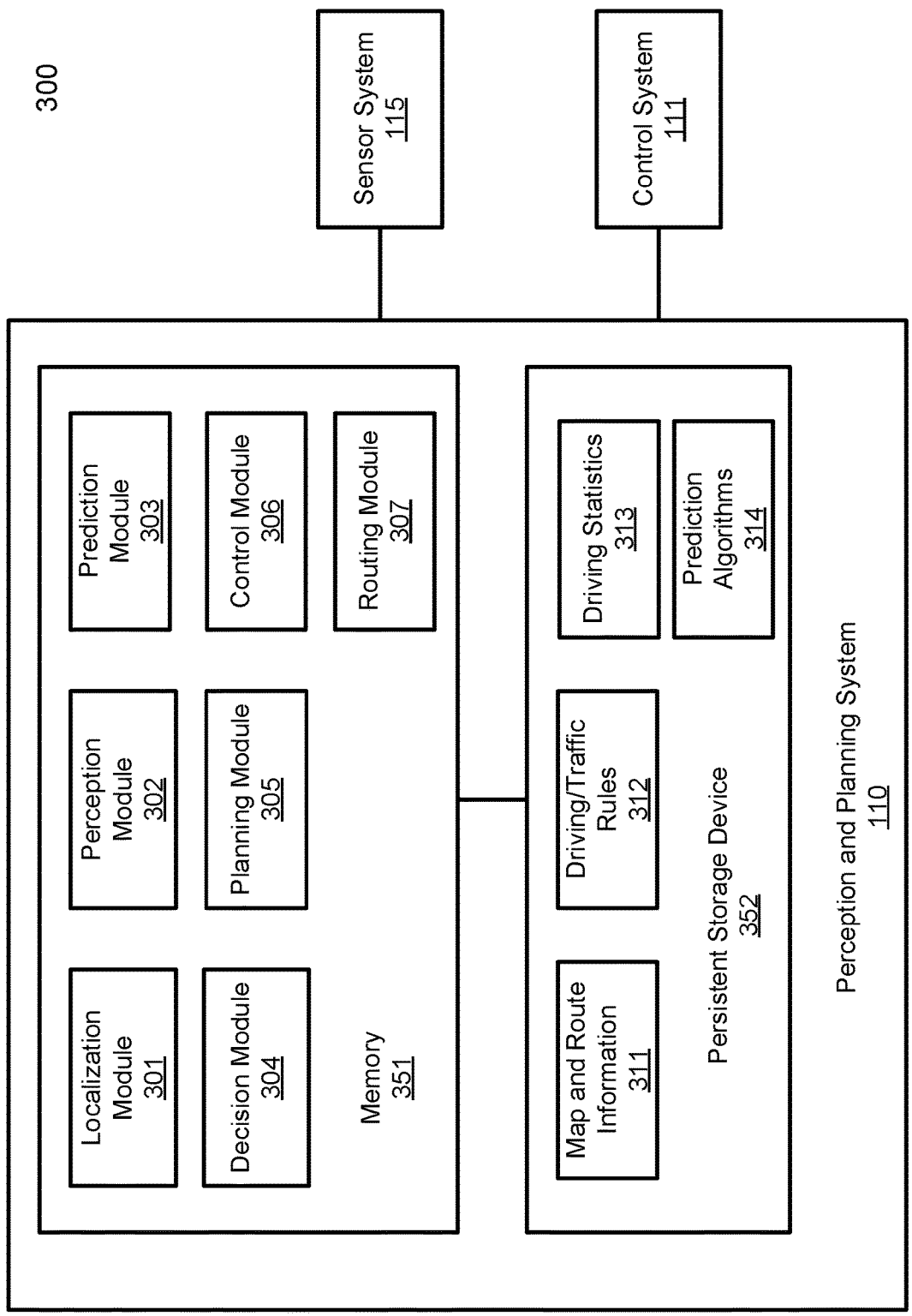
FIGS. 3A-3B are block diagrams illustrating an example of a perception and planning system used with an autonomous vehicle according to one embodiment.
Figure 3B:
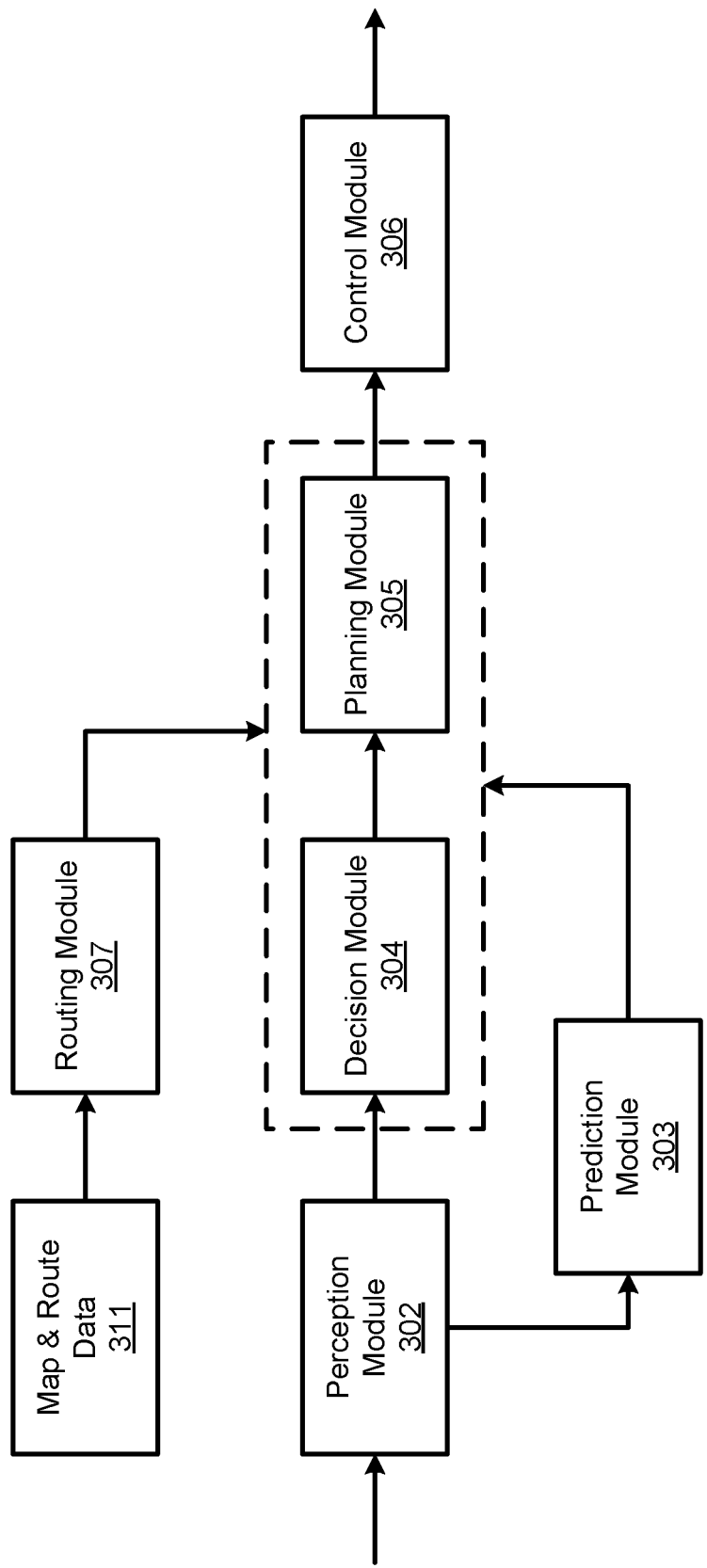

FIGS. 3A and 3B are block diagrams illustrating an example of a perception and planning system used with an autonomous vehicle according to one embodiment. System 300 may be implemented as a part of autonomous vehicle 101 of FIG. 1 including, but not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module, referred to as a planning and control (PnC) module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Although not shown, system 110 further includes a data collector or data logging module to collect and log data related to the operations performed by modules 301-307. For example, the collected data may record any predictions of movement of obstacles perceived, any decisions made, any paths and trajectories planned, and the responses or states of the vehicle (e.g., speed, heading, acceleration, locations) at different points in time of each driving cycle, etc. The collected data may be stored in persistent storage device as a part of driving statistics 313. The collected data may be utilized as a part of historical driving statistics in subsequent driving cycles of the ADV of the same trip or alternatively, the collected data may be analyzed by a data analytics system (e.g., data analytics system 103 of FIG. 1) offline, for example, for training a machine-learning model or for improving autonomous driving algorithms or rules.

According to one embodiment, in predicting a movement of a moving object, after the normal prediction of the moving object (e.g., based on prior predicted movements and/or actual movements of the moving object), prediction module 303 performs a posterior analysis in view of the current state of an ADV, such as, for example, the relative location, speed, and heading direction of the ADV. The analysis is utilized to adjust or improve the prediction of the moving object. As a result, the interaction between the moving object and the ADV is taken into consideration during the prediction process to improve the accuracy of the movement prediction of the moving object. The rationale behind it is that how the ADV moves may affect the reaction and movement of the moving object, or vice versa.

Figure 4:
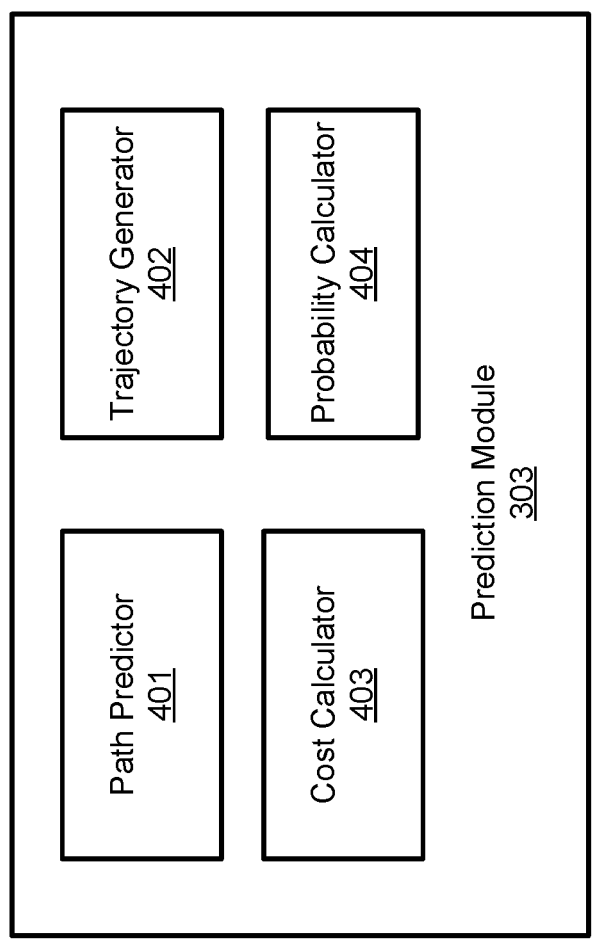
FIG. 4 is a block diagram illustrating an example of a prediction module according to one embodiment.
Figure 5:
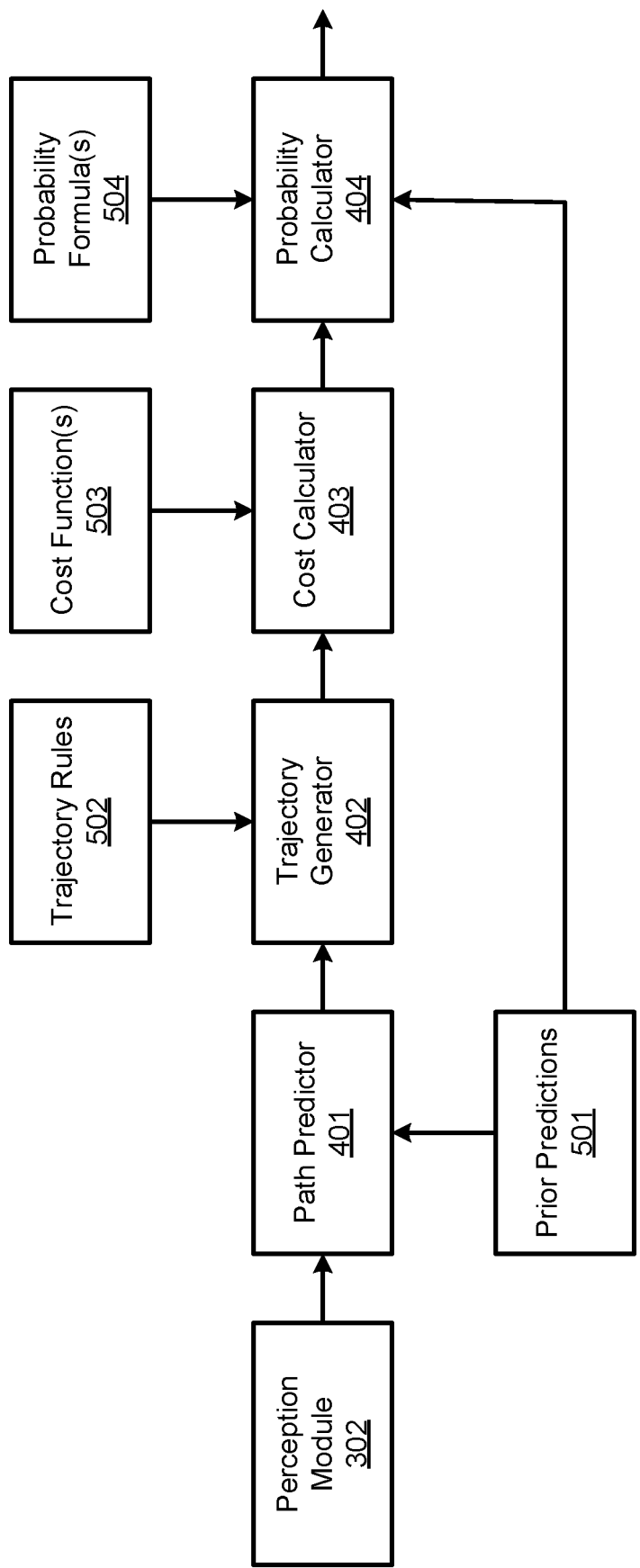
FIG. 5 is a processing flow diagram illustrating a prediction process according to one embodiment.

FIG. 4 is a block diagram illustrating an example of a prediction module according to one embodiment and FIG. 5 is a processing flow diagram illustrating a prediction process according to one embodiment. Referring to FIG. 4 and FIG. 5, in one embodiment, prediction module 303 includes path predictor 401, trajectory generator 402, cost calculator, and probability calculator 404. Modules 401-404 may be integrated into fewer modules or a single module, and may be implemented in software, hardware, or a combination thereof. Path predictor 401 is configured to predict or determine a set of one or more possible paths that a moving object may move under the circumstances. Trajectory generator 402 is configured to generate a set of one or more trajectory candidates for each of the possible paths. Cost calculator 403 is configured to calculate a cost of each trajectory candidate for selecting a representative trajectory of the set. Probability calculator 404 is configured to calculate a probability of each possible path the moving object likely moves.

According to one embodiment, in response to perceiving a moving object (e.g., a vehicle) by perception module 302, path predictor 401 determines one or more possible object paths of the moving object based on the prior movement predictions 501 of the moving object (e.g., performed during prior planning cycles), for example, using a machine-learning predictive model applied to the prior predictions or driving statistics. The predictive model may be created based on a large amount of driving statistics of different vehicles under a variety of driving scenarios. For each of the possible object paths, trajectory generator 602 generates a set of trajectory candidates based on a set of predetermined accelerations as part of trajectory rules or algorithms 502.

Referring now to FIG. 6A, in this example, ADV 601 and moving object 602 are approaching the intersection. In one embodiment, path predictor 401 determines a set of one or more possible paths, also referred to as possible object paths, in which moving object 402 may move. In this example, moving object 602 could turn left via path 611, move straight via path 612, or turn right 613, while ADV 601 could drive straight or turn left. For the purpose illustration, without considering the current state of ADV 601, the moving probabilities for paths 611-613 may be 30%, 60%, and 30% respectively based on the prior movements of moving object 602 as a part of driving statistics 313 and/or prior prediction data 501. Such moving probabilities are determined without considering the state of ADV 601, where ADV 601 could move straight or turn left with certain speed, heading, and acceleration at the point in time.

For each of possible object paths 611-613, according to one embodiment, trajectory generator 402 generates a set of trajectory candidates using trajectory rules or algorithms 502. Each of the trajectory candidates corresponds to one of the predetermined accelerations. In one embodiment, the set of predetermined accelerations include a set of accelerations [0.0, −0.5, −1.0, −1.5, −2.0, −2.5, and −3.0], where a negative acceleration represents deceleration. Thus, for each of the possible paths, a set of trajectory candidates is generated, each corresponding to one of the predetermined accelerations on a longitudinal direction. On the lateral direction, according to one embodiment, the lateral position of each trajectory point of each trajectory candidate may be determined according to a predetermined lateral positioning algorithm. In one embodiment, the lateral position can be determined as: $l(t)=l(0)*\exp(-0.95t)$. The $l(t)$ represents a lateral position of the trajectory candidate at time (t) with respect to the current lateral position of the moving object or starting location of the trajectory candidate $l(0)$.

Figure 6B:
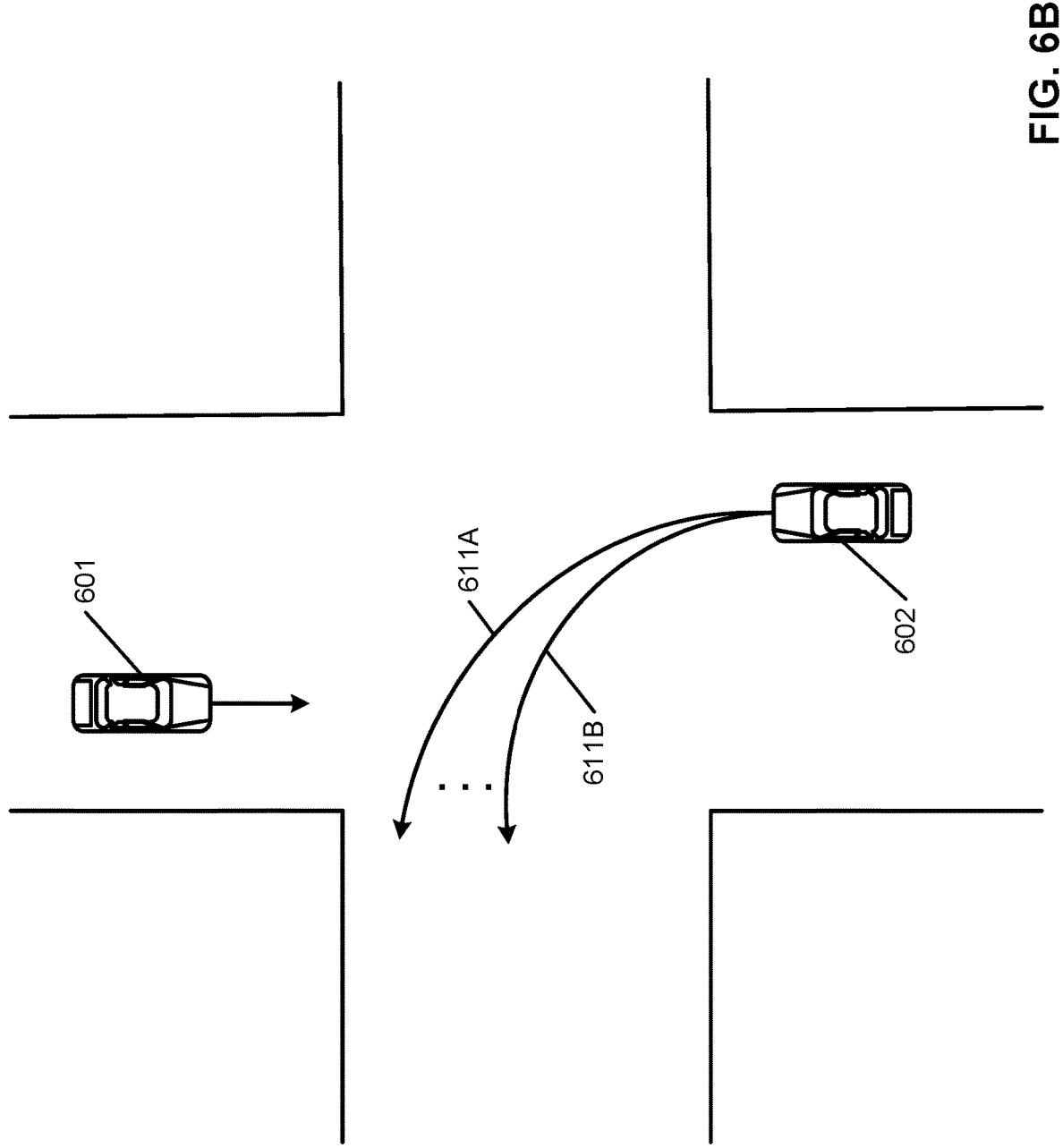

Referring now to FIG. 6B, for the purpose of illustration, for possible object path 611, a set of trajectory candidates 611A-611B is generated. Each of trajectory candidates 611A-611B corresponds to one of the predetermined accelerations as described above. For example, trajectory candidate 611A may correspond to acceleration of 0.0, while trajectory candidate 611B may correspond to acceleration of −3.0. Each of the predetermined accelerations represents a comfort level of the passengers riding in the moving object (e.g., vehicle) if the moving object is to move according to the corresponding predetermined acceleration. As the acceleration (or the deceleration) becomes larger, the lesser will the comfort level be.

For each of trajectory candidates 611A-611B, in one embodiment, cost calculator 504 calculates a trajectory cost for the trajectory candidate using cost function or algorithm 503. One of the trajectory candidates 611A-611B having the lowest trajectory cost amongst the trajectory candidates is selected to represent the corresponding possible object path. A moving probability of the selected trajectory candidate is calculated by probability calculator 404 using a predetermined formula 504. An ADV path is planned, for example, by planning module 305, to navigate the ADV to avoid collision with the moving object based on the lowest costs of the possible object paths of the moving object.

In one embodiment, in calculating the cost for each of the trajectory candidates, a centripetal acceleration cost and a collision cost are calculated for the trajectory candidate. The trajectory cost of the trajectory candidates is then determined based on the centripetal acceleration cost and the collision cost. When calculating the centripetal acceleration cost of a trajectory candidate, according to one embodiment, a set of trajectory points along the trajectory candidate is determined and selected. The trajectory points may be evenly distributed in time along the trajectory candidate.

Figure 6C:
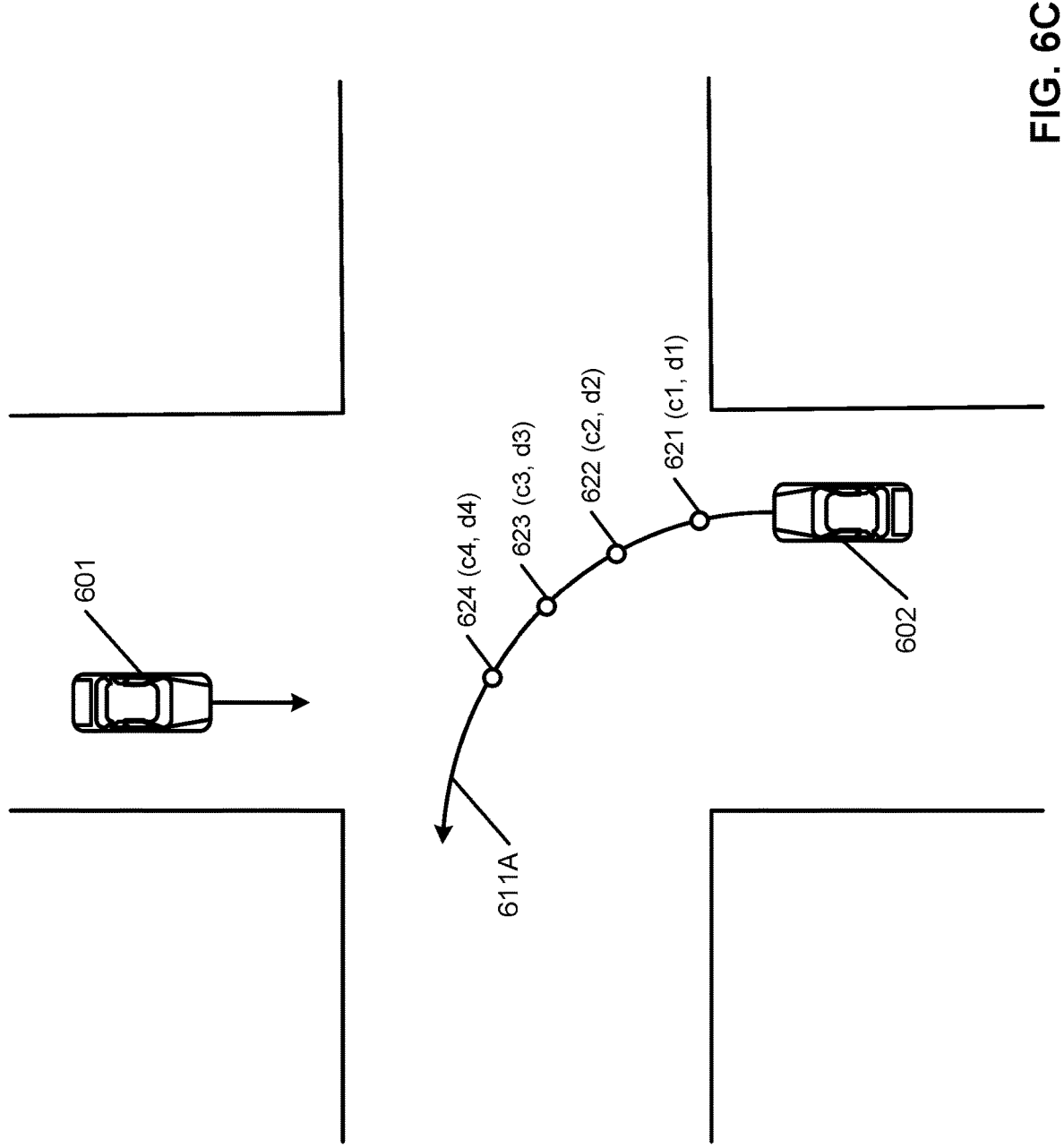

Referring now to FIG. 6C, in this example, trajectory points 621-624 are selected along trajectory candidate 611A, where trajectory points 621-624 may be evenly selected in time. For each of the trajectory points, a centripetal acceleration is calculated for the trajectory point. A centripetal acceleration refers to an acceleration of an object moving in uniform circular motion, resulting from a net external force, the centripetal acceleration; centripetal means "toward the center" or "center seeking." The direction of centripetal acceleration is toward the center of the circle.

A centripetal acceleration may be determined based on the speed (v) of the moving object 602 and the curvature at the point in time associated with the trajectory point. In one embodiment, a centripetal acceleration (c) can be calculated as: $c=v^2*curvature$, at the point in time of the curve of the trajectory. Alternatively, $c=v^2/r$, where r represents the radius of the curve of the trajectory the point in time.

The centripetal acceleration cost is then determined based on the centripetal accelerations of all the trajectory points using a first cost function. In this example, the centripetal accelerations for trajectory points 621-624 are calculated as c1, c2, c3, and c4 respectively. In one embodiment, a centripetal acceleration cost can be determined based on the following formula:

Centripetal Acceleration Cost=$(c1^2+c2^2+c3^2+c4^2)/(|c1|+|c2|+|c3|+|c4|)$

In one embodiment, when calculating a collision cost for a trajectory candidate, a relative distance between ADV 601 and each of the trajectory points 621-624 is determined, referred to as d1, d2, d3, and d4 in this example. The collision cost of the trajectory candidate is determined based on the relative distances between the trajectory points and the ADV using a second cost function. In one embodiment, a collision cost can be determined based on the following formula:

Collision cost=[(exp(−$d1$))$^2$+(exp(−$d2$))$^2$+ (exp(−$d3$))$^2$+(exp(−$d4$))$^2$]/(|$d1$|+|$d2$|+|$d3$|+|$d4$|)

The trajectory cost (Cost$_T$)=centripetal acceleration cost+ collision cost.

According to a further embodiment, for each of the possible object paths, a likelihood value or likelihood probability (P$_{likelihood}$) is determined based on the lowest trajectory cost, where the likelihood value represents the likelihood that the moving object will move according to the selected trajectory candidate. In one embodiment, the likelihood value can be determined as follows: P$_{likelihood}$= exp (−α*Cost$_T$), where α is a tunable coefficient.

A moving probability (P$_{moving}$) of the moving object for the possible object path is calculated based on the likelihood value and a prior probability (P$_{prior}$) of the selected trajectory candidate (e.g., probability calculated during a prior driving or planning cycle). In one embodiment, the moving probability can be determined as follows:

P$_{moving}$=P$_{prior}$*P$_{likelihood}$

Figure 6D:
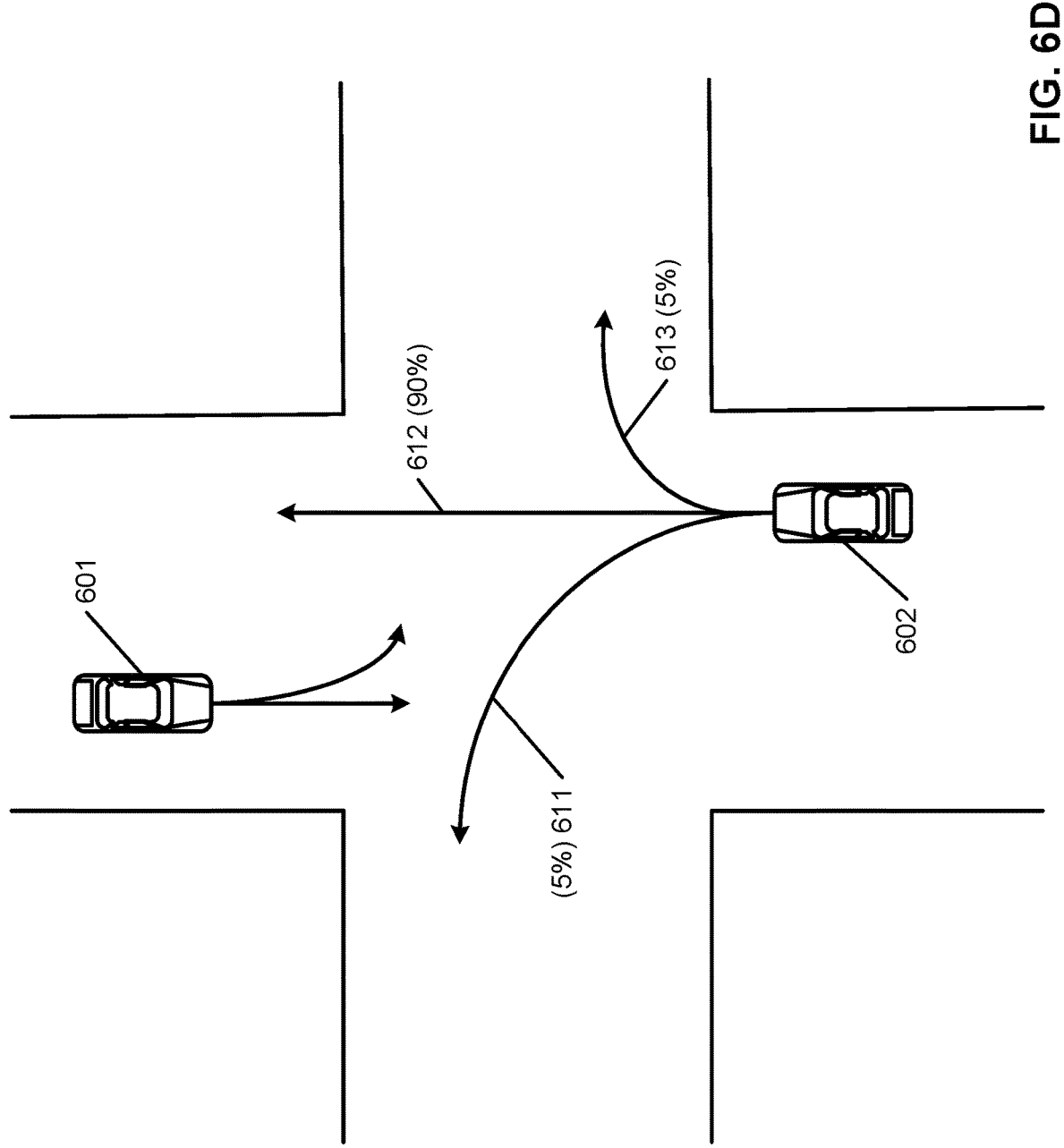

As a result, the moving probabilities of the possible object paths may be adjusted in view of the state of the ADV 501 as shown in FIG. 6D. A possible object path with the highest moving probability is then utilized as the final predicted movement of the moving object. In one embodiment, for each trajectory candidate at least 8 trajectory points are selected with one second in time apart between two adjacent trajectory points (e.g., a total of 8 seconds in time along the trajectory). In the above example, trajectory points (c1, d1), (c2, d2), (c3, d3), (c4, d4), (c5, d5), (c6, d6), (c7, d7), and (c8, d8) will be created and the above formulas can be applied to each of the 8 trajectory points.

The rationale behind this approach is that given the state of ADV 601, moving object 602 may decide to move differently. For example, if the speed of ADV 601 is high, moving object 602 may yield for turning left. Alternatively, if moving object 602 decides to move straight via path 612, however, if ADV 601 starts turning left, moving object 602 may decelerate to yield by allowing ADV 601 turning left first, or moving object may accelerate to move in front of ADV 601 if the relative distance between ADV 601 and moving object 602 is sufficient large enough. By considering the interaction between ADV 601 and moving object 602, the prediction of movement of moving object 602 can be more accurate.

Note that the above operations may be iteratively performed for each of the moving objects perceived within a predetermined proximity of the ADV. The ADV path is planned based on the moving probabilities of all the moving objects perceived. The above described techniques can also be applied to a variety of driving scenarios such as lane changing scenario as shown in FIGS. 7A and 7B. FIG. 7A shows the moving probabilities of possible object paths without considering the interaction with the ADV, while FIG. 7B shows the moving probabilities of the possible object paths in view of the state of the ADV. A moving object can be a vehicle, a motorcycle, a bicycle, a pedestrian, or some other objects.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

FIG. 8 is a flow diagram illustrating a process of predicting movement of a moving object in autonomous driving according to one embodiment. Process 800 may be performed by processing logic which may include software, hardware, or a combination thereof. For example, process 800 may be performed by prediction module 303. Referring to FIG. 8, in operation 801, in response to perceiving a moving object, one or more possible object paths are determined based on prior movement or prior prediction of the moving object. For each of the possible object paths, in operation 802, processing logic generates a set of trajectory candidates based on a set of predetermined accelerations. The set of accelerations may be those set forth above. In operation 803, a trajectory cost is calculated for each of the trajectory candidates using a predetermined cost function. In one embodiment, the trajectory cost includes a centripetal acceleration cost and a collision cost using a respective cost formula as described above. In operation 804, one of the trajectory candidates having the lowest trajectory cost amongst the trajectory costs of the trajectory candidates is selected. In operation 805, an ADV path is then planned to navigate the ADV to avoid collision with the moving object based on the lowest trajectory costs associated with the possible object paths.

Figure 9:
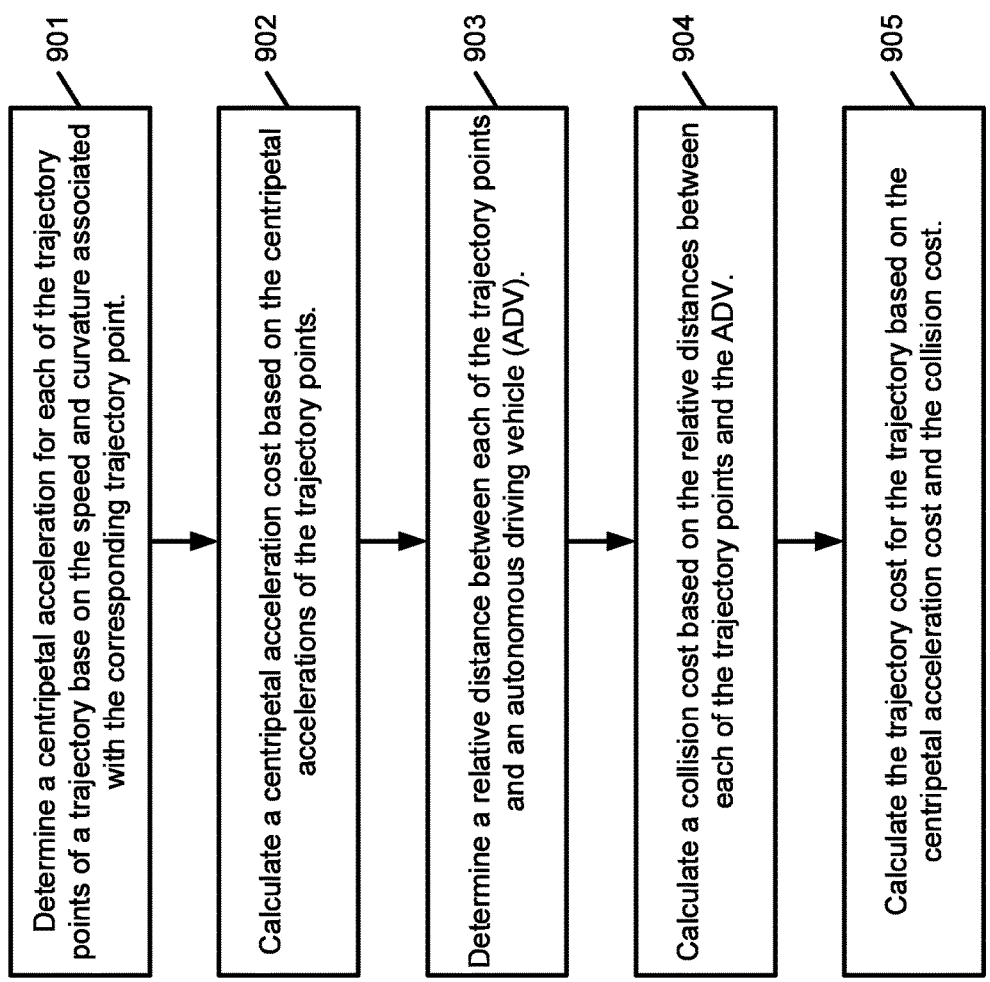
FIG. 9 is a flow diagram illustrating a process of calculating a trajectory cost according to one embodiment.

FIG. 9 is a flow diagram illustrating a process of predicting movement of a moving object in autonomous driving according to one embodiment. Process 900 may be performed as a part of operations involved in operation 803. Referring to FIG. 9, for a given trajectory, in operation 901, a centripetal acceleration for each of the trajectory points along the trajectory is determined based on the speed and curvature corresponding to the trajectory point. In operation 902, a centripetal acceleration cost is calculated based on the centripetal accelerations of the trajectory points. In operation 903, a relative distance between each of the trajectory points and an ADV is determined. In operation 904, a collision cost is calculated based on the relative distances between the ADV and all of the trajectory points. In operation 905, the total trajectory cost for the trajectory is calculated based on the centripetal acceleration cost and the collision cost. In one embodiment, the total trajectory cost is the sum of the centripetal acceleration cost and the collision cost.

Figure 10:
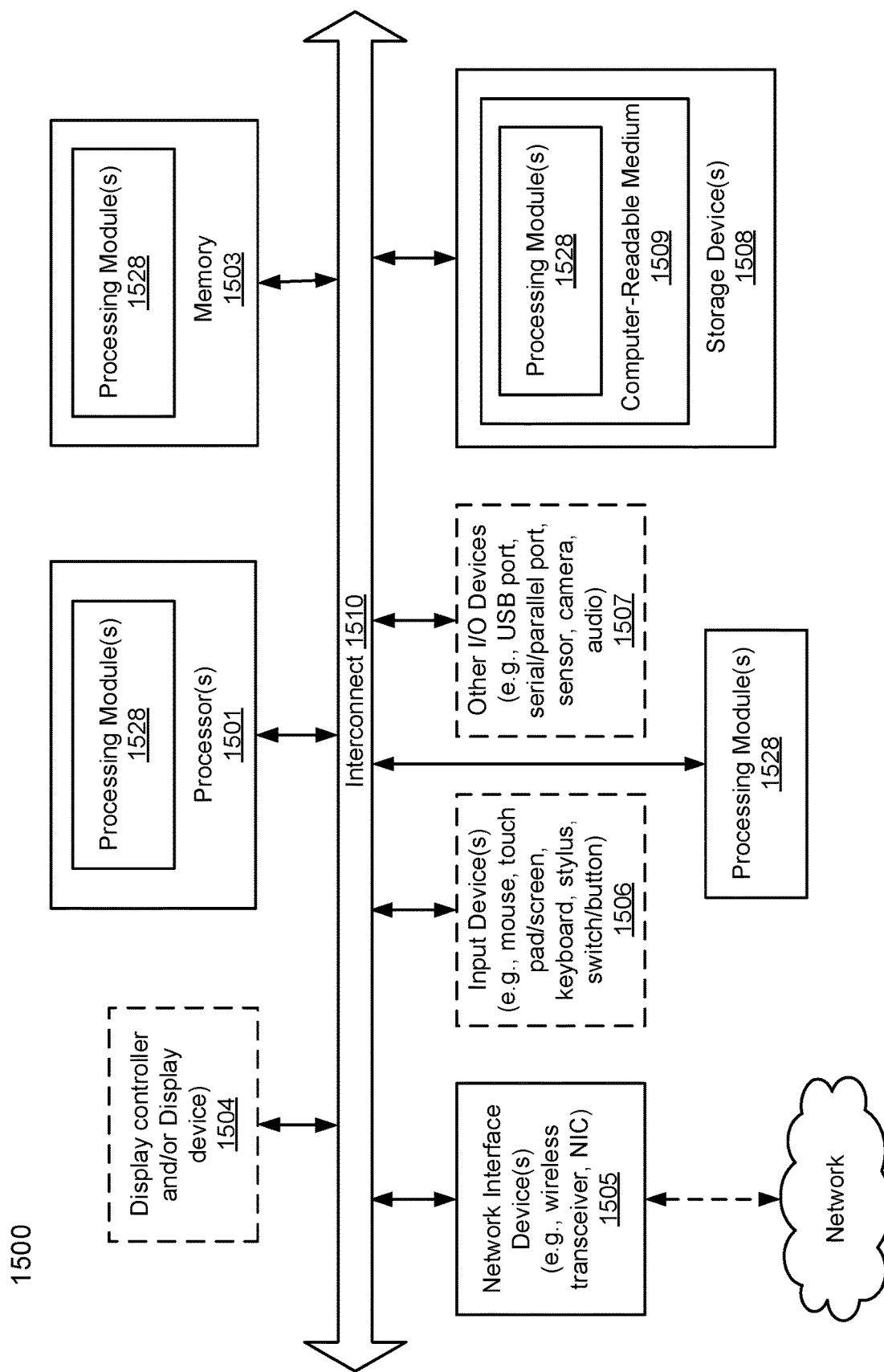
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, prediction module 303, planning module 305, and/or control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   in response to perceiving a moving object, determining one or more possible object paths based on prior movement predictions of the moving object;
   for each of the possible object paths,
      generating a set of trajectory candidates based on a set of predetermined accelerations,
      calculating a trajectory cost for each of the trajectory candidates using a predetermined cost function, and
      selecting one of the trajectory candidates with a lowest trajectory cost amongst the trajectory candidates to represent the possible object path; and
   planning an ADV path to navigate the ADV to avoid collision with the moving object based on the lowest trajectory costs associated with the possible object paths of the moving object.

2. The method of claim 1, further comprising:
for each of the possible object paths, calculating a moving probability based on the trajectory cost of the selected trajectory candidate; and
selecting one of the possible object paths having a highest moving probability, wherein the ADV path is planned based on the selected possible object path of the moving object.

3. The method of claim 2, wherein calculating a moving probability of a possible object path comprises:
determining a likelihood probability based on the lowest trajectory cost associated with the possible object path, wherein the likelihood probability represents a likelihood that the moving object will move according to the possible object path; and
calculating the moving probability of the possible object path based on the likelihood probability and a prior probability of the possible object path.

4. The method of claim 1, wherein each of the trajectory candidates is associated with one of the predetermined accelerations with which the moving object moves along the trajectory candidate.

5. The method of claim 1, wherein calculating a cost for each of the trajectory candidates comprises:
calculating a centripetal acceleration cost for the trajectory candidate using a first predetermined cost function;
calculating a collision cost for the trajectory candidate using a second predetermined cost function; and
calculating the trajectory cost of the trajectory candidate based on the centripetal acceleration cost and the collision cost.

6. The method of claim 5, wherein calculating a centripetal acceleration cost for the trajectory candidate comprises:
determining a plurality of trajectory points along the trajectory candidate;
for each of the trajectory points, calculating a centripetal acceleration for the trajectory point; and
calculating the centripetal acceleration cost based on the centripetal accelerations of the trajectory points.

7. The method of claim 6, wherein the centripetal acceleration of each trajectory point is determined based on a speed of the moving object and a curvature at the trajectory point of the trajectory candidate.

8. The method of claim 6, wherein the trajectory points are selected evenly in time along the trajectory candidate.

9. The method of claim 5, wherein calculating a collision cost for the trajectory candidate comprises:
determining a plurality of trajectory points along the trajectory candidate;
for each of the trajectory points, determining a relative distance between the trajectory point and the ADV at a point in time corresponding to the trajectory point; and
calculating the collision cost based on the relative distances between the trajectory points and the ADV.

10. A non-transitory machine-readable medium having instructions stored therein, which when executed by a processor, cause the processor to perform operations, the operations comprising:
in response to perceiving a moving object, determining one or more possible object paths based on prior movement predictions of the moving object;
for each of the possible object paths,
generating a set of trajectory candidates based on a set of predetermined accelerations,
calculating a trajectory cost for each of the trajectory candidates using a predetermined cost function, and
selecting one of the trajectory candidates with a lowest trajectory cost amongst the trajectory candidates to represent the possible object path; and
planning an ADV path to navigate the ADV to avoid collision with the moving object based on the lowest trajectory costs associated with the possible object paths of the moving object.

11. The machine-readable medium of claim 10, wherein the operations further comprise:
for each of the possible object paths, calculating a moving probability based on the trajectory cost of the selected trajectory candidate; and
selecting one of the possible object paths having a highest moving probability, wherein the ADV path is planned based on the selected possible object path of the moving object.

12. The machine-readable medium of claim 11, wherein calculating a moving probability of a possible object path comprises:
determining a likelihood probability based on the lowest trajectory cost associated with the possible object path, wherein the likelihood probability represents a likelihood that the moving object will move according to the possible object path; and
calculating the moving probability of the possible object path based on the likelihood probability and a prior probability of the possible object path.

13. The machine-readable medium of claim 10, wherein each of the trajectory candidates is associated with one of the predetermined accelerations with which the moving object moves along the trajectory candidate.

14. The machine-readable medium of claim 10, wherein calculating a cost for each of the trajectory candidates comprises:
calculating a centripetal acceleration cost for the trajectory candidate using a first predetermined cost function;
calculating a collision cost for the trajectory candidate using a second predetermined cost function; and
calculating the trajectory cost of the trajectory candidate based on the centripetal acceleration cost and the collision cost.

15. The machine-readable medium of claim 14, wherein calculating a centripetal acceleration cost for the trajectory candidate comprises:
determining a plurality of trajectory points along the trajectory candidate;
for each of the trajectory points, calculating a centripetal acceleration for the trajectory point; and
calculating the centripetal acceleration cost based on the centripetal accelerations of the trajectory points.

16. The machine-readable medium of claim 15, wherein the centripetal acceleration of each trajectory point is determined based on a speed of the moving object and a curvature at the trajectory point of the trajectory candidate.

17. The machine-readable medium of claim 15, wherein the trajectory points are selected evenly in time along the trajectory candidate.

18. The machine-readable medium of claim 14, wherein calculating a collision cost for the trajectory candidate comprises:
determining a plurality of trajectory points along the trajectory candidate;
for each of the trajectory points, determining a relative distance between the trajectory point and the ADV at a point in time corresponding to the trajectory point; and
calculating the collision cost based on the relative distances between the trajectory points and the ADV.

19. A data processing system, comprising:
  a processor; and
  a memory coupled to the processor to store instructions, which when executed by the processor, cause the processor to perform operations, the operations including
  in response to perceiving a moving object, determining one or more possible object paths based on prior movement predictions of the moving object,
  for each of the possible object paths,
    generating a set of trajectory candidates based on a set of predetermined accelerations,
    calculating a trajectory cost for each of the trajectory candidates using a predetermined cost function, and
    selecting one of the trajectory candidates with a lowest trajectory cost amongst the trajectory candidates to represent the possible object path, and
  planning an ADV path to navigate the ADV to avoid collision with the moving object based on the lowest trajectory costs associated with the possible object paths of the moving object.

20. The system of claim 19, wherein the operations further comprise:
  for each of the possible object paths, calculating a moving probability based on the trajectory cost of the selected trajectory candidate; and
  selecting one of the possible object paths having a highest moving probability, wherein the ADV path is planned based on the selected possible object path of the moving object.

\* \* \* \* \*